(No Model.)
W. B. BROWN.
WAGON BRAKE.
No. 567,375.   Patented Sept. 8, 1896.
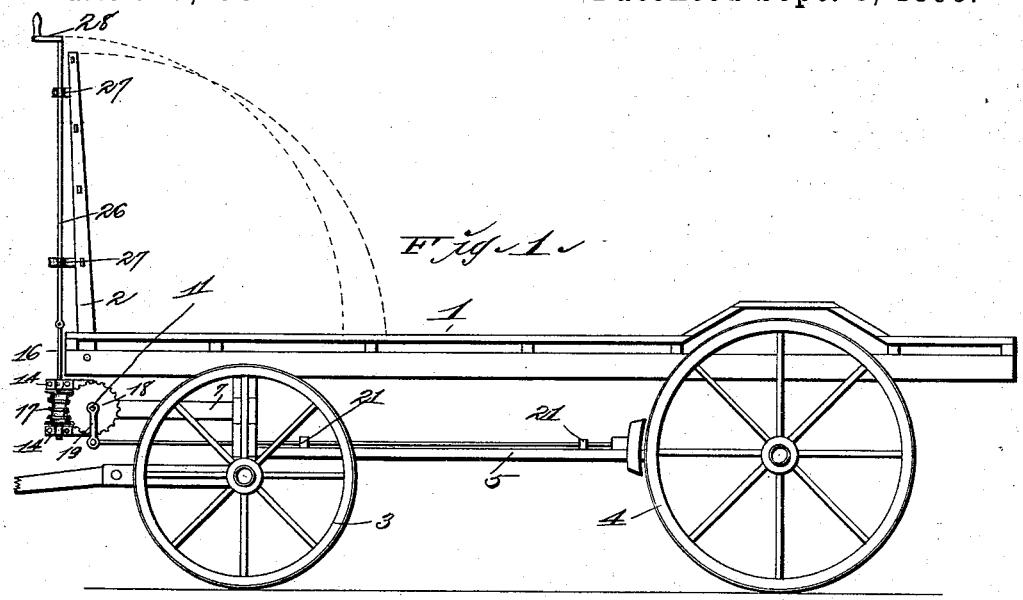
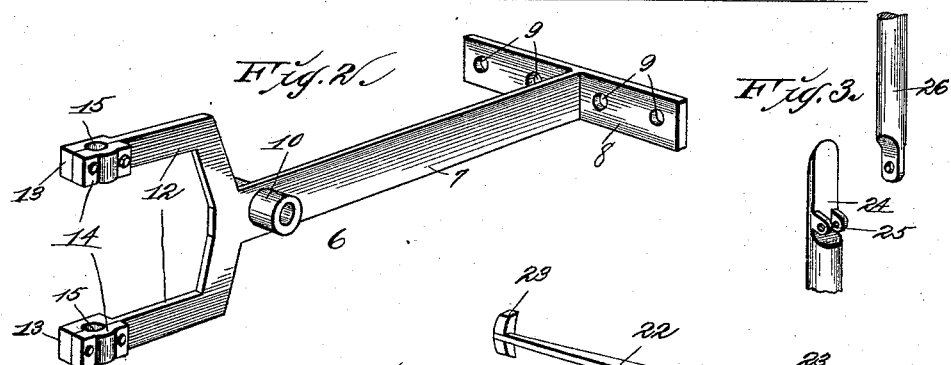
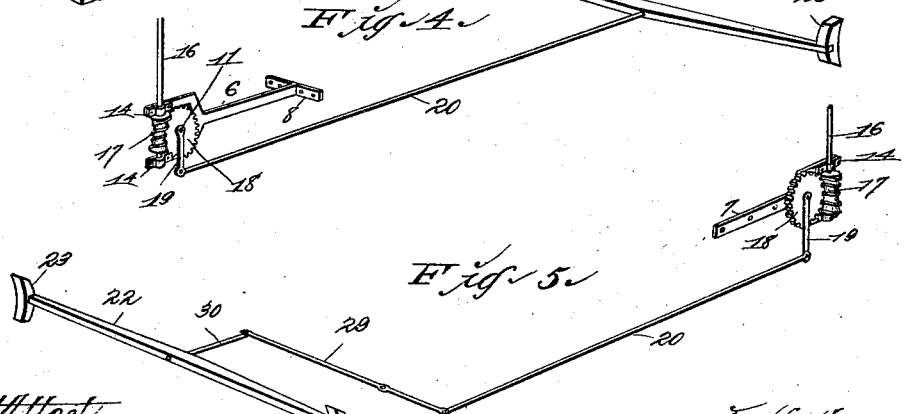
Attest
M. P. Smith.
John L. Timson.
Inventor:
William B. Brown
by Higdon & Higdon & Longan
Att'ys.

UNITED STATES PATENT OFFICE.

WILLIAM B. BROWN, OF LABADDIE, MISSOURI, ASSIGNOR OF ONE-HALF TO FRANK M. NORTH, OF SAME PLACE.

WAGON-BRAKE.

SPECIFICATION forming part of Letters Patent No. 567,375, dated September 8, 1896.

Application filed May 21, 1895. Serial No. 550,139. (No model.)

*To all whom it may concern:*

Be it known that I, WILLIAM B. BROWN, of the city of Labaddie, Franklin county, State of Missouri, have invented certain new and useful Improvements in Wagon-Brakes, of which the following is a full, clear, and exact description, reference being had to the accompanying drawings, forming a part hereof.

My invention relates to an improved brake that is especially applicable for use upon hay-frames, though said brake may be used to advantage upon any ordinary wagon.

My invention consists in certain novel features of construction, combination, and arrangement of parts, hereinafter described and claimed.

Referring to the drawings, Figure 1 is a side elevation of an ordinary hay-frame mounted on wheels and showing my improved brake in position upon said hay-frame. Fig. 2 is a view in perspective of the main frame or casting I use in carrying out my invention. Fig. 3 is a view in perspective of a hinge connection of which I make use in carrying out my invention. Fig. 4 is a view in perspective of the brake used upon a hay-frame, said brake being detached from said frame. Fig. 5 is a view in perspective of the brake constructed for use upon an ordinary wagon, said brake being detached from said wagon.

Referring by numerals to the accompanying drawings, 1 indicates an ordinary hay-frame, 2 the ladder thereof, 3 the front wheels, and 4 the rear wheels, the bolsters of said wheels being connected in the ordinary manner by a reach 5.

The frame 6 of my brake comprises the body portion 7, from the rear of which and at right angles to said body portion extend the ears 8, provided with bolt-holes 9, by means of which the frame or bracket is securely positioned beneath the forward end of the hay-frame and to one of the front bolsters.

Near the forward end of the body portion 7 and formed integral therewith is a bearing 10, adapted to receive a shaft 11. The front end of the frame or bracket 6 is bifurcated or forked, as indicated by 12, the forward ends 13 of said forked portions, together with the plates 14, bolted to said forward ends 13, form journal-bearings 15. A vertical rod 16 is adapted to be mounted in these bearings 15, and an ordinary worm 17 is rigidly mounted upon said vertical shaft 16 near the bifurcated ends 12 of the frame or bracket 6. A worm-wheel 18 is mounted upon the shaft 11 in such a position as to mesh with and be turned by the worm 17.

On the outer end of the shaft 11, and depending therefrom, is a bar 19, to the lower end of which is pivoted a horizontally-moving rod 20, that passes through bearings 21, suitably located upon the reach 5, and is rigidly connected at its rear end to the longitudinal center of the brake-beam 22, on the outer ends of which are the ordinary brake-shoes 23. At a point a short distance above the upper bearing 15 the shaft 16 terminates. It is at this termination provided with a cut-away portion 24 and ears 25. A vertical rod 26 has its lower end so formed as to adapt it to be positioned between the ears 25 and be bolted therein. As the upper end of the shaft 16 extends a short distance beyond the ears 25, it will be seen how the rod 26 can move in but one direction. The rod 26 is vertically positioned immediately in front of the ladder 2, and is held in position thereon by means of suitable bearings 27. The upper end of the rod 26 is provided with a crank and handle 28.

In constructing one of my brakes for use upon an ordinary wagon the frame or bracket 6 is bolted directly to the side of the wagon-box. The rod 20 passes along the side of said wagon-box, and is pivoted to the end of a lever, 29 that is pivoted to the under side of the wagon-box, or to the reach, the other end of said lever 29 being pivoted to the short rod 30, that extends from a central point on the brake-beam.

The operation is as follows: When the hay-frame is not loaded, the ladder 2 and vertical rod 26 are turned down and onto the bed of the hay-frame, as indicated by dotted lines in Fig. 1. This can be easily done, as the ladder 2 is hinged at its lower point, and the rod 26 is hinged to the upper end of the shaft 16. The rod 26 must, however, be turned to the correct position before it can be thrown down. By reason of the different points where the lower ends of the ladder 2 and the rod 26 are hinged, said rod will necessarily slide along a short distance in the bearings 27. When the hay-frame is loaded, the ladder 2 and rod 26 must necessarily be thrown to an upright position. When it is desired to use the brake, the driver manipulates the crank-handle 28, which in turn will rotate the rod 26, shaft 16, and worm 17. The worm 17, meshing with the worm-wheel 18, will cause said worm-wheel to rotate, and said worm-wheel being rigidly mounted upon the shaft 11, said shaft will necessarily be rotated, which, in turn, will impart motion to the bar 19 and throw the lower end of same rearwardly, thus causing the longitudinal rod 20 to move rearwardly, which will throw the brake-shoes 23 into engagement with the rear wheels 4. By a reverse movement of the crank-handle 28 the brake-shoes 23 are released from engagement with the rear wheels. By constructing the hinge between the shaft 16 and the rod 26 in the manner described it will be seen how the ladder 2 is materially assisted from being pushed or crowded too far forward when the hay-frame is heavily loaded. Thus it will be seen how I have constructed a brake especially applicable for hay-frames, that can be operated from the top of a load of hay, that is simple and durable, and positive and efficient in all its workings.

What I claim is—

A wagon-brake, comprising a body portion 7, ears 8 extending from the rear of said body portion 7 and at right angles thereto and having the bolt-holes 9 by means of which the frame is securely positioned beneath the forward end of a hay-rack and to one end of the front bolster, a bearing 10 attached to said body portion near the forward end, a shaft 11 mounted in said bearing, plates 14 bolted to the bifurcated ends 13 of the brackets 6 thus forming the journal-bearings 15, the vertical rod 16 mounted in said journal-bearings 15, the worm 17 rigidly mounted upon said vertical shaft 16 near the bifurcated ends of the frame, the worm-wheel 18 mounted upon the shaft 11 in such a position as to mesh with and be turned by the worm 17, the bar 19 on the outer end of the shaft 11 and depending therefrom, the horizontally moving rod 20 pivoted to the lower end of said bar 19, the bearings 21 located upon the reach 5 of the wagon through which bearings the rod 20 passes, said rod being rigidly connected at its rear end to the longitudinal center of the brake-beam 22, the brake-shoes 23 on the outer ends of said brake-beam, the ears 25 at the termination of the shaft 16, there being a cut-away portion 24 near said ears, the vertical rod 26 having its lower end so formed as to adapt it to be positioned between the ears 25 and bolted therein and arranged to move in but one direction, the bearings 27 by which said rod 26 is held in position immediately in front of the ladder of the hay-rack, the handle 28 on the upper end of said rod 26, all arranged substantially as and for the purposes stated.

In testimony whereof I affix my signature in presence of two witnesses.

WILLIAM B. BROWN.

Witnesses:
FRANK M. NORTH,
MAUD GRIFFIN.